(12) United States Patent  (10) Patent No.: US 6,672,074 B2
Tiemann  (45) Date of Patent: Jan. 6, 2004

(54) GAS TURBINE

(75) Inventor: Peter Tiemann, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 35 days.

(21) Appl. No.: 10/104,627

(22) Filed: Mar. 21, 2002

(65) Prior Publication Data

US 2002/0148233 A1 Oct. 17, 2002

(30) Foreign Application Priority Data

Mar. 30, 2001 (EP) .............................. 01108173

(51) Int. Cl.$^7$ ................................. F02C 7/18
(52) U.S. Cl. ....................... 60/806; 415/115
(58) Field of Search ................ 60/782, 785, 806; 415/115

(56) References Cited

U.S. PATENT DOCUMENTS

| 3,015,937 A | 1/1962 | Giliberty |
| 3,936,215 A | 2/1976 | Hoff |
| 4,901,520 A | 2/1990 | Kozak et al. |
| 5,488,825 A | * 2/1996 | Davis et al. .................. 60/806 |
| 6,089,010 A | 7/2000 | Gross |
| 6,298,657 B1 | * 10/2001 | KaTaoka et al. ............... 60/806 |
| 2002/0148214 A1 | * 10/2002 | Tiemann ...................... 60/806 |

FOREIGN PATENT DOCUMENTS

| DE | 196 29 191 | 1/1998 |
| EP | 0 933 517 | 8/1999 |

* cited by examiner

Primary Examiner—Louis J. Caesargola

(57) ABSTRACT

In a turbine (1) having a moving-blade row which has a moving blade (12) on a turbine shaft (8), and having a guide blade (14) which has a guide-blade row, an especially high efficiency is to be achieved with simple means with the turbine blades (12, 14) being cooled in a reliable manner. To this end, the cooling-medium passage inside the guide blade (14), according to the invention, is split up into a first and a second partial-flow passage, the cooling medium flowing in the first partial-flow passage being used for cooling the guide blade (14), and the cooling medium flowing in the second partial-flow passage being passed on more or less free of losses.

12 Claims, 2 Drawing Sheets

GAS TURBINE

CROSS-REFERENCE TO RELATED APPLICATIONS

This application claims priority to EP/01108173.4, filed Mar. 30, 2001 under the European Patent Convention and which is incorporated by reference herein in its entirety.

1. Field of the Invention

The invention relates to a gas turbine having a number of moving blades in each case combined to form moving-blade rows and arranged on a turbine shaft and having a number of guide blades in each case combined to form guide-blade rows and connected to a turbine casing.

2. Background of the Invention

Gas turbines are used in many fields for driving generators or driven machines. In the process, the energy content of a fuel is used for producing a rotational movement of a turbine shaft. To this end, the fuel is burned in a combustion chamber, in the course of which air compressed by a compressor is supplied. In this case, the working medium which is produced in the combustion chamber by the combustion of the fuel and is under high pressure and high temperature is directed via a turbine unit connected downstream of the combustion chambers, where it expands to perform work.

In this case, to produce the rotational movement of the turbine shaft, a number of moving blades normally combined in blade groups or blade rows are arranged on the turbine shaft and drive the latter via an impulse transfer from the working medium. In addition, in order to direct the working medium in the turbine unit, guide-blade rows connected to the turbine casing are normally arranged between adjacent moving-blade rows.

In addition to the output achievable, an especially high efficiency is normally a design aim when designing such gas turbines. In this case, an increase in the efficiency, for thermodynamic reasons, can in principle be achieved by increasing the outlet temperature with which the working medium flows out of the combustion chamber and into the turbine unit. Therefore temperatures of about 1200° C. to 1300° C. are aimed at for such gas turbines and are also achieved. At such high temperatures of the working medium, however, the components exposed to the working medium are subjected to high thermal loads. In order to nonetheless ensure a comparatively long service life of the affected components with high reliability, cooling of the affected components, in particular of moving and/or guide blades of the turbine unit, is normally provided. The turbine blades are therefore normally designed to be coolable, in which case, in particular, effective and reliable cooling of the first blade rows as viewed in the direction of flow of the working medium is to be ensured. For the cooling, the respective turbine blade in this case normally has a cooling-medium passage which is integrated in the blade body or the blade profile and from which a cooling medium can be specifically directed in particular to the thermally loaded zones of the turbine blade.

The cooling medium used in this case is normally cooling air. This cooling air is normally fed to the respective turbine blade in the manner of an open cooling system via an integrated cooling-medium passage. After discharging from the turbine blade, the cooling air is mixed with the working medium directed in the turbine unit. However, the design output of a gas turbine cooled in this way is limited, in particular since, in view of the limited mechanical loading capacity of individual components of the gas turbine, a further increase in output can normally only be achieved by an augmented supply of fuel. This in turn results in a comparatively increased demand for cooling medium for cooling the turbine blades, and this demand in turn means losses in the available compressor mass flow. These losses in turn can only be tolerated to a limited extent.

The object of the invention is therefore to specify a gas turbine of the abovementioned type which, with reliable cooling of the turbine blades, is suitable for an especially high design output.

This object is achieved according to the invention by the integrated cooling-medium passage of a guide blade being split up into a first and a second partial-flow passage in such a way that a first partial flow of the cooling medium flowing in the first partial-flow passage is largely used for cooling this guide blade, and that the second partial flow of the cooling medium flowing in the second partial-flow passage is passed on more or less free of losses.

In this case, the invention is based on the idea that an especially high design output can be achieved at a high efficiency of the gas turbine by losses being kept especially low in the available compressor mass flow. In order to keep these losses especially low, the gas turbine should therefore be designed for an especially low demand for cooling medium, in particular cooling air. This can be achieved by virtue of the fact that, while abandoning the concept of an open cooling system, a closed cooling system is provided in which the cooling medium is supplied to the combustion process after flowing through the turbine blades to be cooled. However, a pressure loss possibly occurs in the cooling-medium line in a cooling system closed in such a way, and this pressure loss in principle rules out the possibility of feeding the cooling medium, flowing off from the turbine blades, into the combustion chamber of the gas turbine.

In order to firstly keep this pressure loss especially low and thus even make possible a cooling system, which is in principle closed, for the turbine blades, provision is made to split up the cooling medium inside the guide blade, one partial flow of the cooling medium cooling the respective guide blade, and the second portion of the cooling medium being directed through the guide blade virtually free of losses. Thus, on the one hand, sufficient cooling medium can be admitted to the guide blade itself, and, on the other hand, further guide blades to be cooled are likewise provided with sufficient cooling medium virtually free of pressure losses. This splitting-up of the cooling medium into two partial flows, with regard to the pressure of the cooling medium, means parallel connection of the cooling systems of the actual guide blades and of the guide blades of the following turbine stage. Abandoning the concept of sequential cooling-medium guidance through the guide blades of adjacent turbine stages and through the guide ring connecting the latter enables the cooling-medium passages to be directed, and this reduces the pressure loss in the cooling medium. In addition, the guidance of the cooling medium is simplified, since the cooling-medium passages are split up in the guide blade. Furthermore, the flow paths relevant to pressure loss can be kept short, and the pressure loss in the cooling medium can accordingly also be kept small, which brings about a reduction in the cooling-medium quantity.

In this case, provision is preferably made for a sufficient quantity of cooling medium to be specifically admitted to the blade profile of the respective guide blade. This is because it is precisely the blade profile of the guide blades forming the first guide-blade row that is subjected to especially high thermal loading, so that it is precisely here that the demand for sufficient cooling is especially high. Cooling medium can therefore be specifically admitted to this region, it also being possible to maintain especially short flow paths for the corresponding cooling-medium flow. Even if a comparatively large quantity of cooling medium is admitted to the blade profile, the pressure loss can thus be kept limited, so that it is possible for the cooling medium flowing off from the blade profile to be fed back into the combustion process of the gas turbine.

In a further advantageous configuration, the cooling medium directed in the second partial-flow passage is provided for the cooling in the guide blade of the second guide-blade row. To this end, the second partial-flow passage is advantageously connected on the outlet side to a cooling-passage system if it directs the cooling medium first of all largely free of losses to the guide blade of the second guide-blade row. The cooling medium flowing through the second partial-flow passage is now sufficiently available for cooling the guide blade of the second guide-blade row. The "spent" cooling medium of the guide blades of the first and second guide-blade rows is then fed via a further cooling-medium passage to the combustion chamber of the gas turbine. The essential pressure drop in the cooling medium is thus kept very low, since the second partial flow of the cooling medium only flows through the guide blades of the second guide-blade row.

It is precisely through this second partial-flow passage that the guide blades forming the second guide-blade row can be fed with a quantity of cooling medium which meets the demand. In particular on account of the lower temperature, compared with the first guide-blade row, to which the second guide-blade row is exposed, the quantity of cooling medium provided for cooling the guide blades forming the second guide-blade row can be proportioned so as to be comparatively small, so that the pressure loss is only limited despite the comparatively long flow path of the cooling medium in the second partial-flow passage.

In an especially advantageous configuration, the cooling-medium compressor connected upstream is to be dimensioned in such a way that the pressure of the "spent" cooling medium, before being fed back into a flow space surrounding the combustion chamber, is virtually identical to the pressure which prevails in the flow space. Such an arrangement ensures that the cooling medium provided for the guide blades has a sufficiently high pressure level, so that at least most of the cooling medium required can be fed back into the combustion process of the gas turbine. It is precisely due to the feedback of the cooling air required into the combustion process that an especially high power output and/or an especially low degree of emissions can be achieved.

The advantages achieved with the invention consist in particular in the fact that the branching of the flow path for the cooling air in the guide blades forming the first guide-blade row enables the cooling air, with a comparatively low pressure loss, to be specifically admitted to the components to be cooled. The pressure loss, which thus occurs only to a limited extent, can be compensated for in particular by the cooling-medium compressor connected upstream on the cooling-medium side, so that, at an invariably high efficiency, recovery of the cooling air for the combustion process, in such a way as to increase output and reduce emissions, is made possible in the manner of a closed cooling system for the respective guide blades. In this case, the cooling-air flow, in such a way as to meet the requirements, is split up in the guide blades forming the first guide-blade row, the first partial flow, with a tolerable pressure loss, being provided for cooling the guide-blade profile, and the second partial flow flowing through this guide blade essentially free of losses. Consequently, the second partial flow, with a tolerable pressure loss overall, can still be used for cooling the guide blades forming the second guide-blade row. The matching in general, with regard to the pressure conditions prevailing in the cooling medium, between the cooling-medium compressor connected upstream and the arrangement of the splitting-up of the cooling-medium passages for parallel admission of cooling medium to the guide blades of adjacent turbine stages permits a reduction in the requisite cooling medium while at the same time maintaining the requisite cooling with the use of the closed cooling-medium guidance.

BRIEF DESCRIPTION OF THE DRAWINGS

An exemplary embodiment of the invention is explained in more detail with reference to drawings, in which.

The same parts are provided with the same reference numerals in both figures.

DETAILED DESCRIPTION OF THE PREFERRED EMBODIMENT

Figure 1:
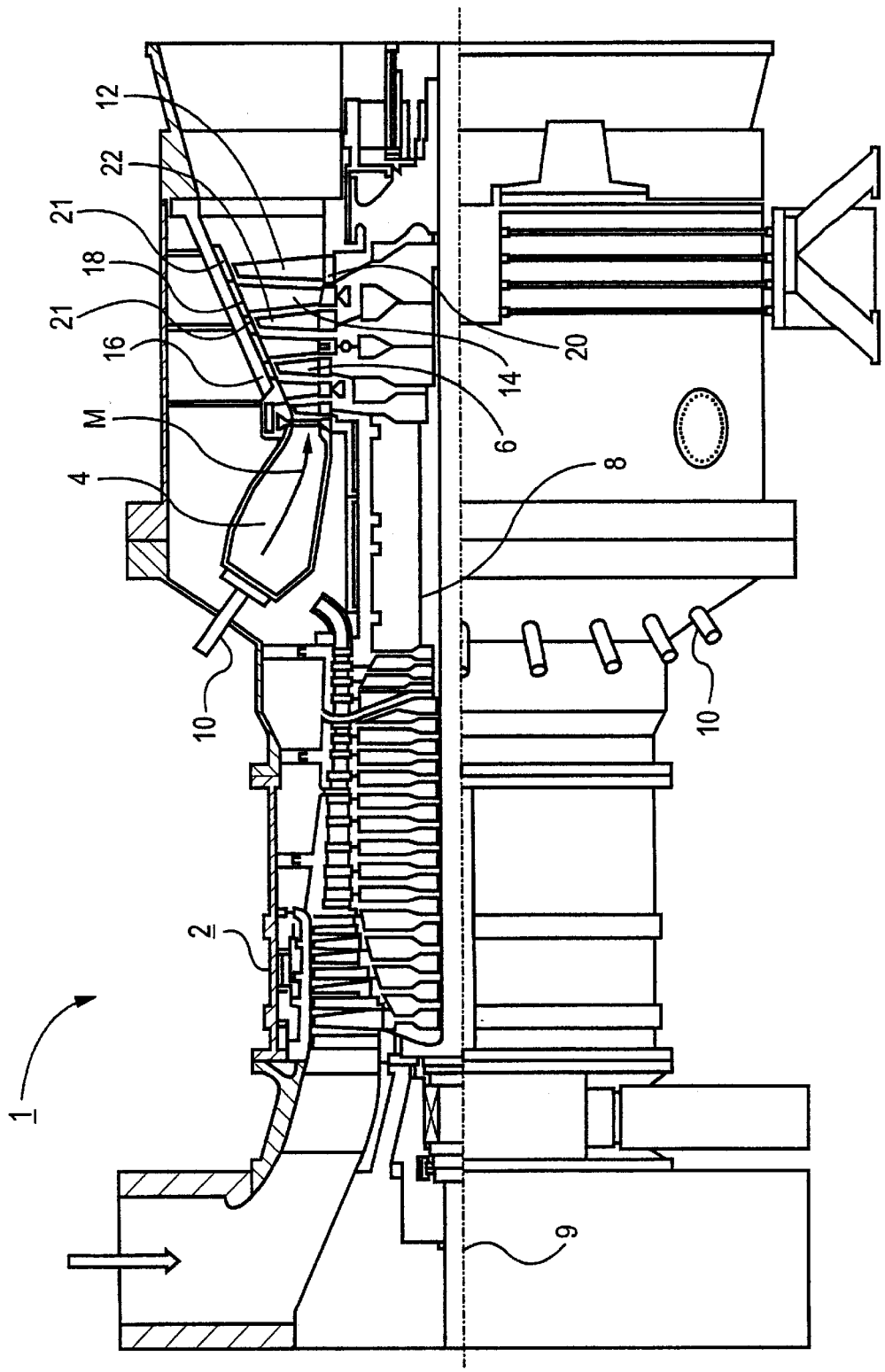
FIG. 1 shows a half section through a gas turbine.

The gas turbine 1 according to FIG. 1 has a compressor 2 for combustion air, a combustion chamber 4 and a turbine 6 for driving the compressor 2 and a generator (not shown) or a driven machine. To this end, the turbine 6 and the compressor 2 are arranged on a common turbine shaft 8 (also designated as turbine rotor) to which the generator or the driven machine is also connected and which is rotatably mounted about its center axis 9.

The combustion chamber 4 is fitted with a number of burners 10 for burning a liquid or gaseous fuel. It is also provided with heat-shield elements (not shown in any more detail) on its inner wall.

The turbine 6 has a number of rotatable moving blades 12 connected to the turbine shaft 8. The moving blades 12 are arranged in a ring shape on the turbine shaft 8 and thus form a number of moving-blade rows. Furthermore, the turbine 6 comprises a number of fixed guide blades 14, which are likewise fastened in a ring shape, while forming guide-blade rows, to an inner casing 16 of the turbine 6. In this case, the moving blades 12 serve to drive the turbine shaft 8 by impulse transfer of the working medium M flowing through the turbine 6. On the other hand, the guide blades 14 serve to guide the flow of the working medium M between in each case two moving-blade rows or moving-blade rings following one another as viewed in the direction of flow of the working medium M. In this case, a successive pair consisting of a ring of guide blades 14 or a guide-blade row and of a ring of moving blades 12 or a moving-blade row is also designated as a turbine stage.

Each guide blade 14 has a platform 18 (also designated as blade root) which is arranged as a wall element for fixing the respective guide blade 14 on the inner casing 16 of the turbine 6. In this case, the platform 18 is a component which is subjected to comparatively high thermal loading and forms the outer boundary of a hot-gas passage for the working medium M flowing through the turbine 6. Each moving blade 12 is fastened to the turbine shaft 8 in a similar manner via a platform 20 (also designated as blade root).

A guide ring 21 is arranged on the inner casing 16 of the turbine 6 in each case between the platforms 18, arranged at a distance from one another, of the guide blades 14 of two adjacent guide-blade rows. In this case, the inner surface of each guide ring 21 is likewise exposed to the hot working medium M flowing through the turbine 6 and is at a radial distance from the outer end 22 of the moving blade 12 opposite it with a gap in between. The guide rings 21 arranged between adjacent guide-blade rows serve here in particular as cover elements which protect the inner wall 16 or other built-in casing parts from thermal overstressing by the hot working medium M flowing through the turbine 6.

Figure 2:
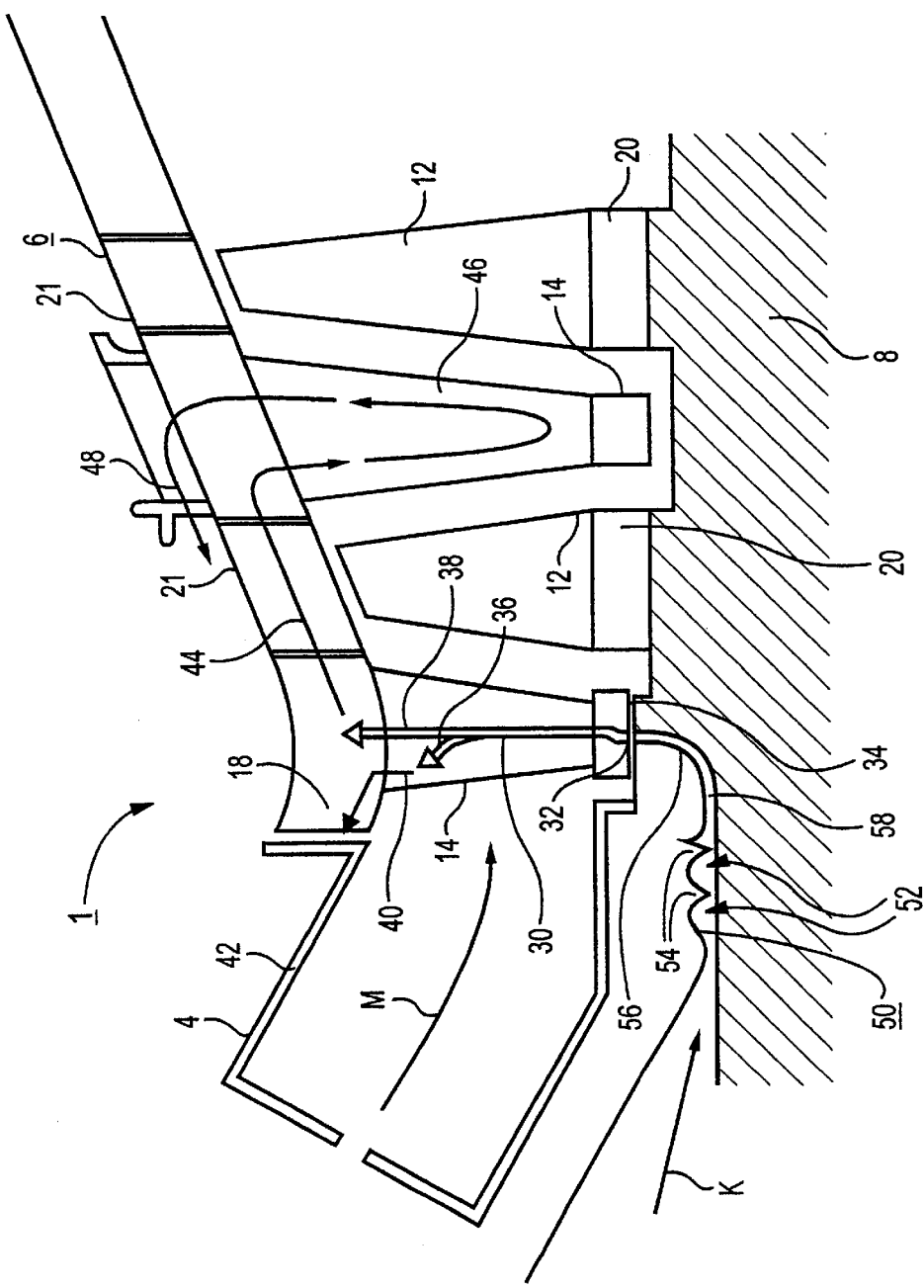
FIG. 2 shows a detail of a longitudinal section of the gas turbine according to FIG. 1 with the representation of cooling passages.

To achieve a comparatively high efficiency, the gas turbine 1 is designed for a comparatively high outlet temperature of the working medium M, discharging from the combustion chamber 4, of about 1200° C. to 1300° C. In order to permit this, at least some of the moving blades 12 and the guide blades 14 are designed to be coolable by cooling air as cooling medium. To illustrate the flow path of the cooling air, the region of the gas turbine 1 which directly follows the combustion chamber 4 is shown enlarged in detail in FIG. 2. Here, it can be seen that the working medium M flowing out of the combustion chamber 4 first of all strikes a number of guide blades 14 which form the "first guide-blade row" and are suspended in the combustion chamber 4 via their respective platform 18. This is then followed, as viewed in the direction of flow of the working medium M, by the moving blades 12 forming the first moving-blade row, by the guide blades 14 forming the second guide-blade row, and by the moving blades 12 forming the second moving-blade row.

In order to permit a high design output at an especially high efficiency of the gas turbine 1, the gas turbine 1 is designed for essentially closed cooling of the guide blades 14 forming the first and the second guide-blade row, provision being made for the "spent" cooling air flowing out of said guide blades 14 to be fed back into the combustion chamber 4 of the gas turbine 1. In order to keep the pressure loss, occurring during such cooling, of the cooling air sufficiently low for its feedback into the combustion chamber 4, the guide blades 14 forming the first guide-blade row as viewed in the direction of flow of the working medium M each have an integrated cooling-medium passage symbolized by the arrow 30. In this case, the inlet 32 of the cooling-medium passage is arranged at the free end 34 of the respective guide blade 14, so that, when cooling medium K is admitted to the cooling-medium passage integrated in the guide blade 14, flow occurs through the respective guide blade 14 from its free end 34 toward its blade root or its platform 18.

Inside the blade body of the respective guide blade 14, the cooling-medium passage, as indicated by the splitting of the arrow 30, branches into a first partial-flow passage symbolized by a first partial-flow arrow 36 and into a second partial-flow passage symbolized by a second partial-flow arrow 38. In this arrangement, the partial-flow passages are each configured in such a way that cooling medium K, with only a comparatively low pressure loss, can be specifically admitted via them to especially relevant points of the gas turbine 1 in each case. Here, the first partial-flow passage symbolized by the first partial-flow arrow 36 is configured for cooling the blade profile of the respective guide blade 14. To this end, the guide blade 14 may have, for example, hollow walls in which the corresponding partial flow of cooling medium K is guided. On the outlet side, the first partial-flow passage, as symbolized by the flow arrow 40, is connected to a passage system which, in turn, communicates on the outlet side with a flow space 42 surrounding the combustion chamber 4. In this case, the compressor mass flow flowing off from the compressor 2 of the gas turbine 1 is admitted to the flow space 42, so that mixing with the compressor mass flow occurs in the form of a feedback when the partial flow of the cooling medium K directed through the first partial-flow passage is fed into the flow space 42. As the process continues, the gas mixture located in the flow space 42 is then supplied to the combustion process of the gas turbine 1.

The second partial-flow passage, symbolized by the second partial-flow arrow 38, inside the blade body of the respective guide blade 14 is connected on the outlet side to a cooling-passage system which is directed through the following guide ring 21 as viewed in the direction of flow of the working medium M and communicates on the outlet side with a cooling-medium passage integrated in a guide blade 14 forming the second guide-blade row as viewed in the direction of flow of the working medium M. For the cooling medium K directed in the second partial-flow passage, a flow path is thus obtained which first of all runs in accordance with the second partial-flow arrow 38 in the original guide blade, passes through the guide ring 21 from there, as indicated by the flow arrow 44, and then, as indicated by the flow arrow 46, runs in a meander shape in a further guide blade 14 belonging to the second guide-blade row. On the outflow side of this further guide blade 14, the respective partial flow of the cooling medium K, as indicated by the flow arrow 48, is likewise fed back into the flow space 42.

By such guidance of the flow of the cooling medium K for the guide blades 14, cooling medium K can be admitted in such a way as to especially meet the requirements. In particular, a comparatively large quantity of cooling medium K can be admitted in the process to the guide blade 14 which forms the first guide-blade row as viewed in the direction of flow of the working medium M and is subjected to comparatively high thermal loading. For the corresponding partial flow, the flow path is kept especially short right up to the feedback into the flow space 42, so that the pressure loss is only limited even when using a comparatively large quantity of cooling medium K. On the other hand, however, cooling medium K can also be admitted to the guide blade 14 forming the second guide-blade row as viewed in the direction of flow of the working medium M. Despite the comparatively long flow path present in this case, the pressure loss is also limited here, especially since the corresponding partial flow of the cooling medium K is not used for cooling purposes for the first guide-blade row as viewed in the direction of flow of the working medium M and can thus flow through the corresponding guide blade 14 essentially without a pressure loss. The pressure loss for the cooling medium K is thus kept especially low overall, so that feedback of the cooling medium K into the flow space 42 and thus into the combustion process of the gas turbine 1 is actually made possible for the first time by the cooling system of the guide blades 14 configured like a closed cooling system.

So that a pressure level required for such feedback of the cooling medium K is maintained in an especially reliable manner, a cooling-medium compressor 50 is connected on the cooling-medium side upstream of the guide blade 14 forming the first guide-blade row as viewed in the direction of flow of the working medium M. In this case, the cooling-medium compressor 50, in the exemplary embodiment, is designed as an axial-flow compressor and comprises a number of compressor elements 52 firmly connected to the turbine shaft 8 and a number of compressor elements 54 firmly connected to the turbine casing 6. Cooling medium K is admitted on the inlet side to the cooling-medium compressor 50, which communicates on the outlet side with the inlet 32 for cooling medium K of the guide blades 14 via a cooling-medium passage 58 defined by the turbine shaft 8 and a casing element 56. In order to admit cooling medium K, the compressor 50 in this case is connected on the inlet side to the compressor 2, so that some of the compressor mass flow flowing off from the compressor 2 can be branched off as cooling medium K for the guide blades 14.

The cooling-medium compressor 50 is adapted in its design to the intended operating case of feedback of the cooling medium K for the guide blades 14 into the combustion process of the gas turbine 1. To this end, the cooling-medium compressor 50 is dimensioned in such a way that, under operating conditions for which it is designed, it produces a pressure increase in the cooling medium K in such a way that the cooling medium K, after flowing through the first or second partial-flow passage and the subsequent flow paths and when being fed back into the flow space 42, approximately has the pressure prevailing there.

What is claimed is:

1. A gas turbine with a turbine casing, comprising a guide-blade row having a guide blade with an integrated cooling-medium passage which is connected to a cooling circuit in which a cooling medium flows, the cooling-medium passage being split into a first and a second partial-flow passage in such a way that a first partial flow of the cooling medium flowing in the first partial-flow passage is largely used for cooling the guide blade, and in that a second partial flow of the cooling medium flowing in the second partial-flow passage is passed on generally free of losses, wherein the second partial flow of the cooling medium is passed on generally free of losses to a guide blade of a next guide-blade row in the direction of flow of the working medium.

2. The gas turbine as claimed in claim 1 wherein a first guide-blade row in the direction of flow of the working medium has a guide blade.

3. A gas turbine, comprising:
    a turbine casing; and
    a guide-blade row at least partially enclosed by the casing, the guide-blade row having a plurality of guide blades and a cooling-medium passage connected to a cooling circuit in which a cooling medium flows,
    wherein the cooling-medium passage is divided inside the guide-blade into a first and a second partial-flow passage so that a first partial flow of the cooling medium flowing in the first partial-flow passage is generally used for cooling the guide blade, and a second partial flow of the cooling medium flowing in the second partial-flow passage is passed generally free of losses.

4. A gas turbine adapted for use in a land-based power generation system, comprising:
    a plurality of guide-blades arranged in a row; and
    a cooling-medium passage in operative communication with the guide blades and connected to a cooling circuit in which a cooling medium flows,
    wherein the cooling-medium passage is divided into a first and a second partial-flow passage, with a first partial flow of the cooling medium flowing in the first partial-flow passage generally used for cooling the guide blade, and a second partial flow of the cooling medium flowing in the second partial-flow passage passed generally free of losses, wherein a cooling-medium compressor which is connected upstream of the cooling circuit is dimensioned so that under operating conditions the compressor produces a pressure increase in the cooling medium such that the cooling medium, when fed back into a flow space surrounding the combustion chamber of the gas turbine, has the approximate pressure prevailing in the flow space.

5. The gas turbine as claimed in claim 4, wherein a first guide-blade row in the direction of flow of the working medium has a guide blade.

6. The gas turbine as claimed in claim 3, wherein a first guide-blade row in the direction of flow of the working medium has a guide blade.

7. The gas turbine as claimed in claim 3, wherein the second partial flow of the cooling medium is passed on generally free of losses to a guide blade of a next guide-blade row in the direction of flow of the working medium.

8. The gas turbine as claimed in claim 3, wherein a cooling-medium compressor which is connected upstream of the cooling circuit is dimensioned so that under operating conditions the compressor produces a pressure increase in the cooling medium such that the cooling medium, when fed back into a flow space surrounding the combustion chamber of the gas turbine, has the approximate pressure prevailing in the flow space.

9. A gas turbine with a turbine casing, comprising a guide-blade row having a guide blade with an integrated cooling-medium passage which is connected to a cooling circuit in which a cooling medium flows, the cooling-medium passage being split inside the guide-blade into a first and a second partial-flow passage in such a way that a first partial flow of the cooling medium flowing in the first partial-flow passage is largely used for cooling the guide blade, and in that a second partial flow of the cooling medium flowing in the second partial-flow passage is passed on generally free of losses.

10. The gas turbine as claimed in claim 9, wherein a first guide-blade row in the direction of flow of the working medium has a guide blade.

11. The gas turbine as claimed in claim 9, wherein the second partial flow of the cooling medium is passed on generally free of losses to a guide blade of a next guide-blade row in the direction of flow of the working medium.

12. The gas turbine as claimed in claim 9, wherein a cooling-medium compressor which is connected upstream of the cooling circuit is dimensioned so that under operating conditions the compressor produces a pressure increase in the cooling medium such that the cooling medium, when fed back into a flow space surrounding the combustion chamber of the gas turbine, has the approximate pressure prevailing in the flow space.

* * * * *